United States Patent [19]

Williamson

[11] Patent Number: 5,148,727
[45] Date of Patent: Sep. 22, 1992

[54] INSTALLATION TOOL FOR LOCKING FASTENERS AND METHOD OF USE

[75] Inventor: Herman L. Williamson, Seal Beach, Calif.

[73] Assignee: Air Industries Corporation, Garden Grove, Calif.

[21] Appl. No.: 479,089

[22] Filed: Feb. 12, 1990

[51] Int. Cl.⁵ .............................................. B25B 13/06
[52] U.S. Cl. ................................. 81/121.1; 81/124.3; 411/3; 411/281
[58] Field of Search .................. 81/121.1, 124.6, 124.3; 411/281, 3

[56] References Cited

U.S. PATENT DOCUMENTS

| | | |
|---|---|---|
| 494,520 | 4/1893 | Sayre . |
| 930,450 | 8/1909 | Zinow . |
| 1,389,927 | 9/1921 | Ball . |
| 1,603,618 | 10/1926 | McClellan . |
| 1,892,119 | 12/1932 | Thompson . |
| 2,796,107 | 6/1957 | Schwaiger . |
| 2,815,787 | 12/1957 | Podell . |
| 3,034,611 | 5/1962 | Zenic . |
| 3,464,306 | 9/1969 | Reynolds et al. . |
| 3,603,132 | 9/1971 | Holmes . |
| 3,698,278 | 10/1972 | Trembley . |
| 3,763,725 | 10/1973 | Reiland . |
| 3,920,338 | 11/1975 | Dahl . |
| 4,408,936 | 10/1983 | Williamson ............................. 411/3 |
| 4,682,520 | 7/1987 | Gray . |

FOREIGN PATENT DOCUMENTS

| | | |
|---|---|---|
| 1199636 | 12/1959 | France . |
| 895237 | 5/1962 | United Kingdom . |
| 922333 | 3/1963 | United Kingdom . |

*Primary Examiner*—James G. Smith
*Assistant Examiner*—Lawrence Cruz
*Attorney, Agent, or Firm*—Knobbe, Martens, Olson & Bear

[57] ABSTRACT

An installation tool for use with locking fasteners which reduces cam off during use. The tool comprises a cylindrical socket wrench having a central axial bore which defines a recess on one end for attachment to a socket driver and an elliptical cavity on the opposite end for engaging the collar of the locking fastener. The installation tool further comprises one or more pockets positioned on the wrenching portion of the cavity. The pockets provide space in which collar mass is deformed. As the collar is deformed to lock the collar and bolt together, collar mass is deformed into the pockets on the tool. The deformed collar mass retains the tool and collar in an engaged position until the collar is completely deformed and the fastener is locked.

3 Claims, 4 Drawing Sheets

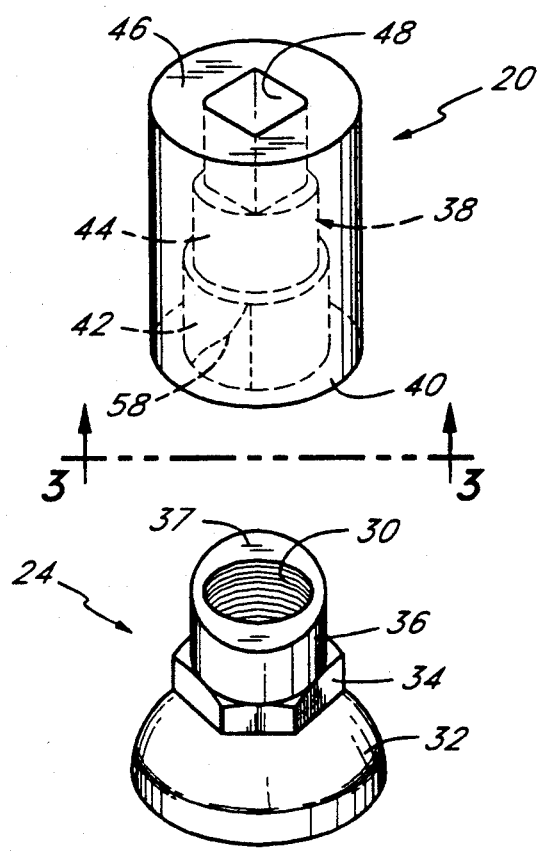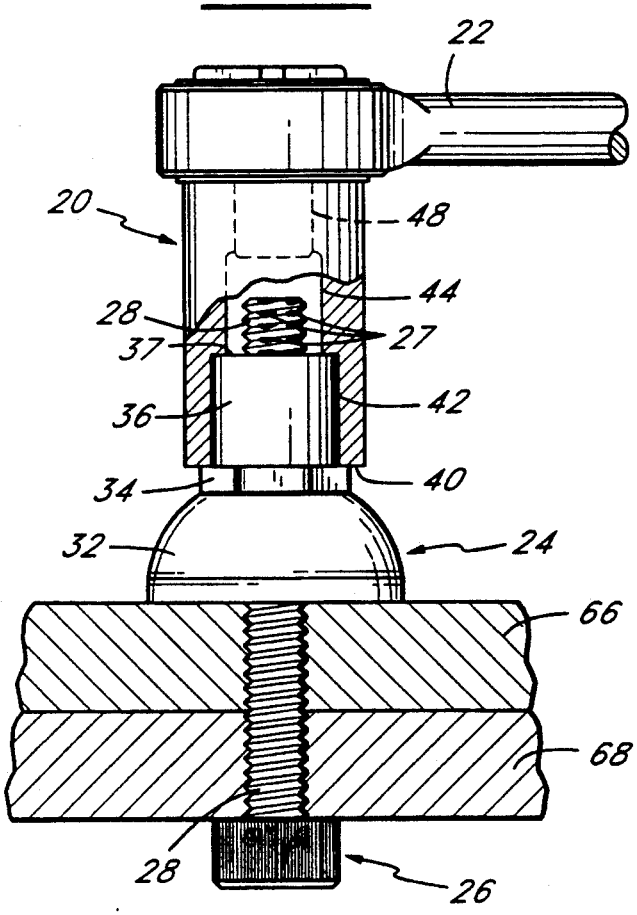
FIG. 1
FIG. 2

INSTALLATION TOOL FOR LOCKING FASTENERS AND METHOD OF USE

BACKGROUND OF THE INVENTION

The present invention relates generally to a tool for installing fasteners, and in particular to a wrench or socket for locking fasteners.

Various systems for locking threaded fasteners have been developed. Some locking fasteners rely on swaging material from a nut or collar into a recess on a bolt or shear pin. One such system is disclosed in U.S. Pat. No. 4,601,623 issued to Wallace. The locking fastener of Wallace includes a shear pin or bolt with exterior threading to engage the axial bore of a nut or collar. The nut has a base and an elliptical end portion. The elliptical end portion is engaged by an installation tool, which is rotated to thread the nut on the bolt. The elliptical portion of the nut is designed to be swaged or deformed by the tool when a specified load between the nut and the bolt is reached and a predetermined torque is applied. The deformation results in the end portion assuming a circular shape, which ensures that only the predetermined torque will be applied, since the installation tool can no longer rotate the nut after deformation is complete. Further, the nut and bolt are locked together by the swaged material of the nut which fills recesses in the threading on the bolt.

The installation tool disclosed in Wallace has an elliptical bore adapted to engage the end portion of the nut. Engaging the nut with the tool and rotating the tool applies torque to thread the nut onto the bolt. Once a predetermined load is reached, the nut is set and the tool rotates further thereby applying radial compression to deform the nut inward toward the bolt. The deformation of the end portion of the nut continues until the end portion has a circular shape and the tool rotates freely on the nut.

One drawback to the installation tool shown in Wallace and others known in the art is a tendency to "cam off" or to be forced away from the nut during fastening. The end portion of the nut resists being deformed and forces the installation tool away from the free end of the nut. This causes the installation tool to become disengaged from the nut and slip when the nut is being tightened. Thus, it becomes difficult to completely deform the nut and properly lock the nut and bolt together. This tendency is emphasized since this type of locking fastener is often installed in mass quantity with automatic power torque wrenches.

The cam off condition may be overcome, but additional force is required to hold the tool in engagement with the nut. For example, pressure must be applied to the end of the tool to force the tool to engage the nut. Therefore, the cam off condition makes securely fastening the nut and bolt of Wallace difficult.

Another locking fastener system is disclosed in U.S. Pat. No. 4,383,353 issued to Stencel. The locking fastener of Stencel comprises a collar with an interior bore threaded for engagement with a pin. On its exterior, the collar has three lobes that extend radially outward from the collar for engagement with an installation tool. The collar is threaded onto the pin, and at a predetermined load the lobes on the collar deform radially inward to lock the collar and the pin together. The installation tool rotates freely on the collar once the lobes have been deformed.

The installation tool used in the system of Stencel experiences a cam off condition similar to the Wallace tool when the lobes are deformed. The lobes resist being compressed inward and force the installation tool in other directions where there is less resistance. Typically, the installation tool is forced upward and away from the collar when the lobes are under compression. This in turn causes the installation tool to slip off of the collar. Thus, the cam off condition makes it difficult to deform the lobes and lock the collar and pin together.

As a result there is need for an installation tool that reduces or eliminates the cam off condition, and allows the user to easily and efficiently fasten a deformable nut or collar and a bolt together.

SUMMARY OF THE INVENTION

The present installation tool advantageously overcomes the cam off tendencies encountered with tools known in the art. The present installation tool preferably comprises a socket having a complementary shaped cavity for engaging a collar. In a preferred embodiment, the tool is adapted to engage an elliptical collar. The tool defines a generally elliptical cavity with wrenching portions, or those portions which directly engage the collar during installation. On the wrenching portions distal the entry end of the tool, a pocket or relief is carved into the interior wall of the cavity. The pockets preferably extend across the upper part of the wrenching portions from the leading edge to the trailing edge. These pockets fill with deformed collar material or mass during installation of a collar, and thus, hold the tool and the collar together to overcome the cam off tendencies.

The present invention also includes a method of installing a collar on a bolt using the present tool. In use, the tool is rotated to thread the collar on the bolt until resistance to threading increases. The tool then deforms the end portion of the collar, beginning at the end closest to the base or work piece and continuing up to the free end of the collar. The deformation of the collar forces masses of collar into the pockets on the interior walls of the tool. The deformed collar masses advantageously hold the installation tool on the collar, and counteract any cam off tendency only during the tightening and deformation of the collar. Once the pockets are filled with collar mass, the tool deforms the collar mass inward to the bolt as the tool moves across the collar. The collar mass is swaged or deformed inward until the collar has a circular shape and the tool can be removed without resistance.

An alternate embodiment of the present invention provides an installation tool which reduces cam off for locking fasteners having collars with multiple deformable lobes, such as that of Stencel. The installation tool has a cavity with a generally cylindrical shape and a longitudinal slot extending radially outward for accommodating each of the deformable lobes on the locking collar. A pocket is defined on each wrenching portion in the slots of the cavity. As the lobes are deformed, collar mass is forced into the pockets and holds the tool on the collar. After the lobes have been completely deformed radially inward, the tool can be disengaged from the collar because the anti-cam off feature is no longer in effect.

It is an object of present invention to provide an installation tool that reduces the tendency to cam off when the nut or collar of a locking fastener is tightened and deformed.

It is a further object of the present invention to provide an installation tool that does not require end pressure on the tool to force engagement of the tool and the collar.

It is still a further object of the present invention to provide a tool that can easily and efficiently fasten and deform locking collars.

BRIEF DESCRIPTION OF THE DRAWINGS

FIG. 1 is a perspective view of the preferred embodiment of the installation tool of the present invention above a prior art deformable collar;

FIG. 2 is a partial cross-sectional view showing the installation tool of FIG. 1 used with a socket driver and a locking fastener;

DESCRIPTION OF THE PREFERRED EMBODIMENTS

Figure 3:
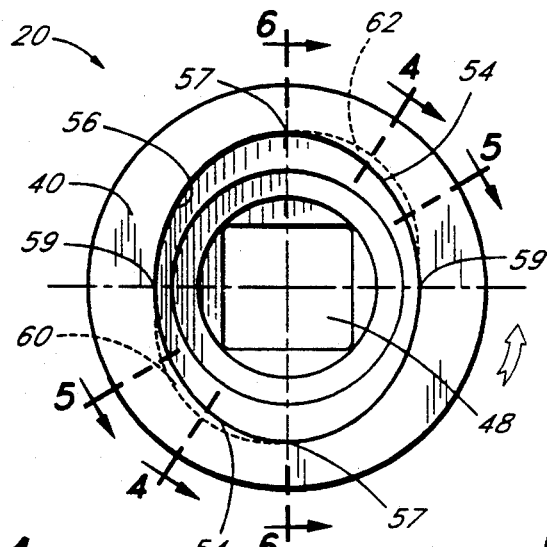
FIG. 3 is a bottom plan view of the installation tool shown in FIG. 1, as viewed from line 3—3 in FIG. 1.

As shown in FIG. 1, the present installation tool 20 has a generally cylindrical shape and is adapted to engage a prior art deformable locking collar or nut 24 of the type disclosed in U.S. Pat. No. 4,601,623 issued to Wallace, which is herein incorporated by reference. As shown in FIG. 2, the installation tool 20 is designed for attachment to a socket driver 22. The socket driver 22 is used to rotate the installation tool 20 and thread the locking collar 24 onto a bolt or pin 26.

The bolt 26 has a threaded portion 28 for engaging the collar 24. Along the threaded portion 28 of the bolt 26, there are a series of recesses 27. These recesses 27 provide an area into which collar material may be deformed to lock the collar 24 and bolt 26 together. The collar 24 has a corresponding central axial bore 30 threaded to receive the threaded portion 28 of the bolt 26. The collar 24 is comprised of a large diameter, circular base 32, a hexagonal central portion 34 and a deformable head portion 36. Preferably, the head portion 36 has an elliptical periphery.

The installation tool 20 has a generally cylindrical external shape with a stepped axial bore 38 therethrough. The stepped axial bore 38 begins at a bottom end 40 of the tool 20 and defines a cavity 42. The cavity 42 is configured to fit closely and interface with the deformable head portion 36 of the collar 24. As is best seen in FIG. 3, the cavity 42 has a shape complimentary to the head portion 36, preferably substantially elliptical in plan view. A central portion 44 of the bore 38 advantageously provides space for the threaded portion 28 of the bolt 26 to extend into the installation tool 20 when the collar 24 is being fastened on the bolt 26. From the central portion 44 to the top end 46 of the tool 20, the axial bore 38 defines a recess 48. The recess 48 has a cross-section, shown as a square, sized and shaped for attachment to the socket driver 22 or any conventional socket wrench.

The installation tool 20 is preferably made of hardened steel or other suitable high strength metal alloys. The installation tool 20 must have the strength required to deform the collar 24. This requires that the cavity 42 in the tool 20 substantially retain its shape throughout the threading of the collar 24 onto the bolt 26.

As shown in FIG. 2, the installation tool 20 slides over the collar 24. The installation tool 20 rotates when a torque is applied by the driver 22. Rotation of the tool 20 in turn applies a torque which causes the collar 24 to thread on the bolt 26. Once there is a predetermined load range between the collar 24 and the bolt 26, continued application of torque fastens the collar 24 by swaging or deforming the head portion 36 of the collar 24 radially inward to lock the collar 24 and bolt 26 together.

As best shown in FIGS. 3–6A, the installation tool 20 has a pair of wrenching portions 54 on the interior wall 56 of the cavity 42. The wrenching portions 54 are those areas on the interior wall 56 of the cavity 42 which directly contact the collar 24 and provide the driving torque during threading of the collar 24 on the bolt 26. In the elliptical cavity 42, the wrenching portions 54 are spaced equally apart along the interior wall 56. The wrenching portions 54 extend over the entire height of the cavity 42 from the central portion 44 to the bottom end 40. The wrenching portions 54 extend across the interior wall 56 from a leading edge 57, the edge of the area in direct contact with the collar 24 that will advance first in the rotation of the tool 20, to a trailing edge 59. For example, for the tool 20 illustrated in FIG. 3, which is adapted to install a right-hand threaded collar, the wrenching portions 54 extend along the interior wall 56 from the leading edge 57 or the major axis of the ellipse formed by the bore 38, clockwise to the trailing edge 59 or minor axis of the ellipse. Thus, each wrenching portion 54 extends across approximately 25% of the interior wall 56 of the cavity 42 from the leading edge 57 to the trailing edge 59.

The preferred embodiment of the installation tool 20 illustrates the tool 20 for the right-hand threaded collar 24 with the wrenching portions 54 and pockets 60, 62 adapted for clockwise rotation of the tool 20. It should be understood that while the installation tool 20 of the present invention is shown and described for right-handed thread, it may also be designed with pockets for a left-handed thread for counter-clockwise rotation of the tool 20.

Figure 4:
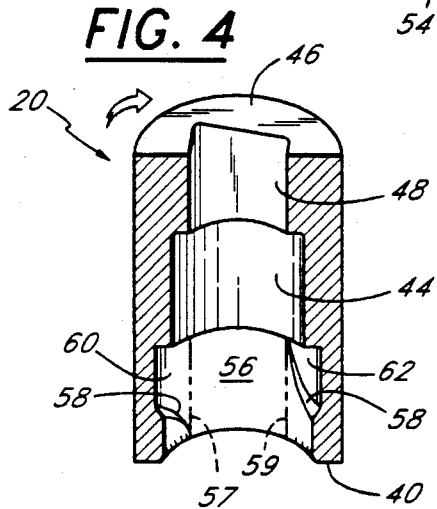
FIG. 4 is a cross-sectional view of the installation tool of FIG. 3, taken along line 4—4.
Figure 5:
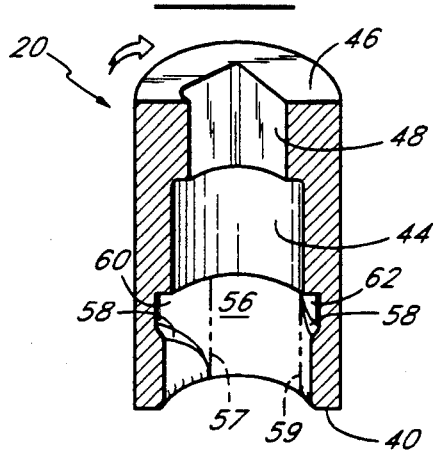
FIG. 5 is a cross-sectional view of the installation tool of FIG. 3, taken along line 5—5.
Figure 6:
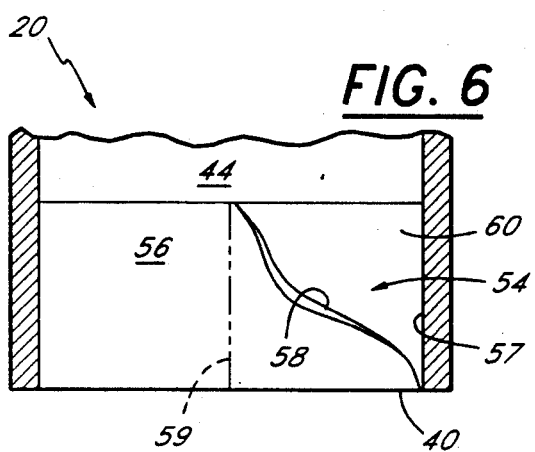
FIG. 6 is a partial cross-sectional elevation taken along line 6—6 of FIG. 3.
Figure 6A:
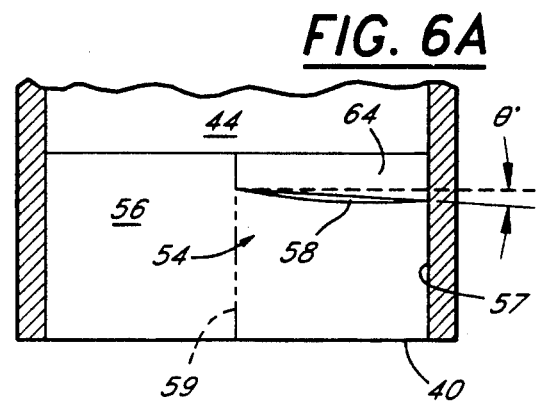
FIG. 6A is a partial cross-sectional elevation taken along line 6—6 of FIG. 3 showing an alternate embodiment for the pockets of the installation tool of the present invention.

As shown in FIGS. 4–6, a pair of pockets or reliefs 60, 62 are carved into the interior wall 56 of the cavity 42. In a preferred embodiment, the pockets 60, 62 cover the area of the wrenching portion 54 defined by the leading edge 57, the trailing edge 59, the central portion 44 and a shoulder 58. The pockets 60, 62 define the shoulder on the interior wall 56 that helps retain the tool 20 on the collar 24 and reduce the cam off tendency. The shoulder 58 extends from the leading edge 57 near the bottom end 40 to the trailing edge 59 near the central portion 44. As is best illustrated in FIG. 6, the pockets 60, 62 have a generally right triangular shape with one side adjacent to the central portion 44 and another side adjacent to the leading edge 57 of the tool 20.

In the present invention, the pockets 60, 62 are advantageously coextensive with the wrenching portions 54. Each pocket 60, 62 extends over less than 25% of the interior wall 56. The pockets 60, 62 do not cover an area larger than their respective wrenching portion 54, but they may extend over less the entire wrenching portion 54. Because of their positioning within the wrenching portions 54, the pockets 60, 62 avoid the cam off tendency of the tool 20 only during the tightening and deforming of the collar 24. The cam off tendency is not affected after the collar 24 is installed. Thus, the tool 20 is free to cam off once the collar 24 is completely deformed. This allows removal of the tool 20 after installation of the collar 24 is complete. Additionally, while the pockets 60, 62 are described as extending from the leading edge 57 to the trailing edge 59 and from the central portion 44 to the bottom end 40 of the tool 20, it should be understood that the pockets 60, 62 may be sized to cover a smaller area of the wrenching portion 54 as long as the pockets 60, 62 are capable of receiving a sufficient amount deformed collar material to avoid the cam off tendency of the tool 20.

As shown in FIGS. 3–5, the depth of the pockets 60, 62 varies along the interior wall 56 of the cavity 42. The pockets 60, 62 are tapered to the interior wall 56 near the leading 57 and trailing 59 edges. The depth of the pockets 60, 62 is greatest in the middle of the wrenching portion 54 and gradually decreases near the edges 57, 59 of the wrenching portion 54 as shown by the dotted lines in FIG. 3. In an exemplary embodiment, the depth of the pockets 60, 62 ranges from zero at the tapered edges 57, 59 to a maximum intermediate the edges 57, 59 of the wrenching portion 54.

The pockets 60, 62 define the shoulder 58 that helps retain the tool 20 on the collar 24 and avoid the cam off forces experienced with other tools known in the art. In the preferred embodiment, the shoulder 58 is a curved incline, however, it should be understood that the shoulder 58 could be made along any other line, curved or straight, connecting the leading edge 57 near the bottom end 40 to the trailing edge 59 near the central portion 44.

The height of the pockets 60, 62, or the distance down from the central portion 44 that the pockets 60, 62 extend, also varies as shown in FIGS. 4–7. For a right-handed thread, the pockets 60, 62 have a reduced height near the trailing 59 of the wrenching portion 54, as shown in FIG. 6. The height of the pockets 60, 62 gradually increases from a minimum at the trailing edge 59 to a maximum at the leading edge 57. The minimum and maximum heights of the pockets 60, 62, are any heights that creates pockets of appropriate size and position to retain deformed collar material sufficient to counter the cam off forces.

The slope or rate of increase for the height of the pockets 60, 62 may be zero to any finite number. The rate at which the height increases is preferably a function of angular distance the tool 20 must be rotated to deform and lock the collar 24 to the bolt 26. The smaller the radial distance, the greater the rate of increase for the height in between the leading 57 and trailing edge 59. For example, if the collar 24 is deformed by half a rotation of the tool 20 then the rate of increase for the height may be four times lower than if the collar 24 is deformed by an eighth of a rotation of the tool 20.

In the preferred embodiment, the pockets 60, 62 have been described as triangular areas covering about half the wrenching portion 54. However, it should be understood that the pockets 60, 62 may be constructed in other shapes. For example, in the alternate embodiment illustrated in FIG. 6A, a pocket 64 has a substantially rectangular shape defined by the leading 57 and trailing 59 edges of the wrenching portion 54 and the shoulder 58 that is substantially parallel to the bottom end 40 of the tool 20. The shoulder 58 extends from the leading edge 57 to the trailing edge 59 of the wrenching portion 54 following a straight line. The shoulder 58 may be sloped as shown by the angle $\theta$ which is the angle between the line along the shoulder 58 and a line parallel to the bottom end 40. In an exemplary embodiment, the angle $\theta$ ranges from zero to five degrees. As with the preferred embodiment, the height of the pocket 64 or the distance for the central portion 44 which the pocket 64 extends may be any distance that provides an area sufficient to retain collar mass to reduce the cam-off tendencies. The alternate pocket 64 is also coextensive with the wrenching portion 54, thus producing anti-cam off effects only during tightening and deformation of the collar 24 like the preferred embodiment.

While the preferred embodiment of the installation tool 20 is shown and described above as an integrally formed socket wrench, it should be understood that the installation tool may be an insert for a standard socket wrench. As an insert, the tool would have a wrenchable exterior adapted for engagement and placement inside a socket wrench. The insert would additionally comprise a cavity with pockets, as in the preferred embodiment, for receiving the collar 24 and reducing the cam off tendency when fastening deformable collars.

Additionally, it should be understood that while the installation tool 20 of the present invention has been described above as having a pair of pockets 60, 62 for receiving deformed collar material, the tool 20 may be constructed with only one pocket on the interior wall 56 of the cavity 42. Such an embodiment of the installation tool 20 with only one pocket is also effective in reducing the cam off tendency only during the tightening and deformation of the collar 24.

Figure 13:
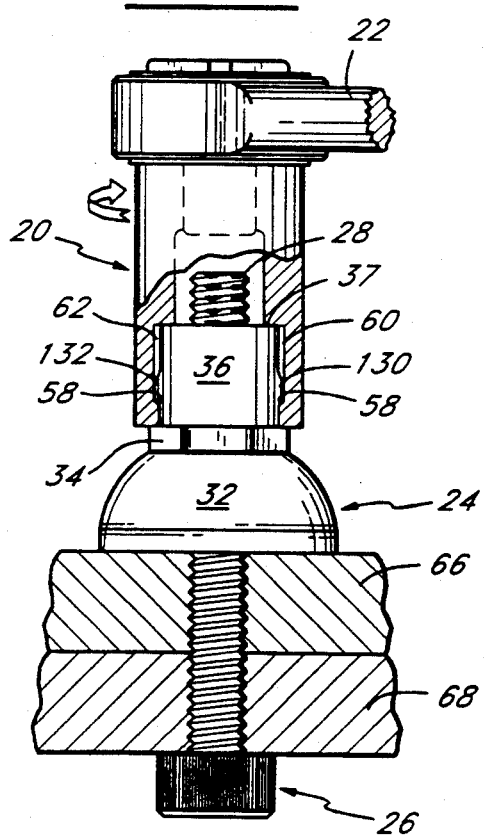
FIG. 13 is the partial cross-sectional view of FIG. 2 with the installation tool and driver rotated to begin deformation of the collar.
Figure 14:
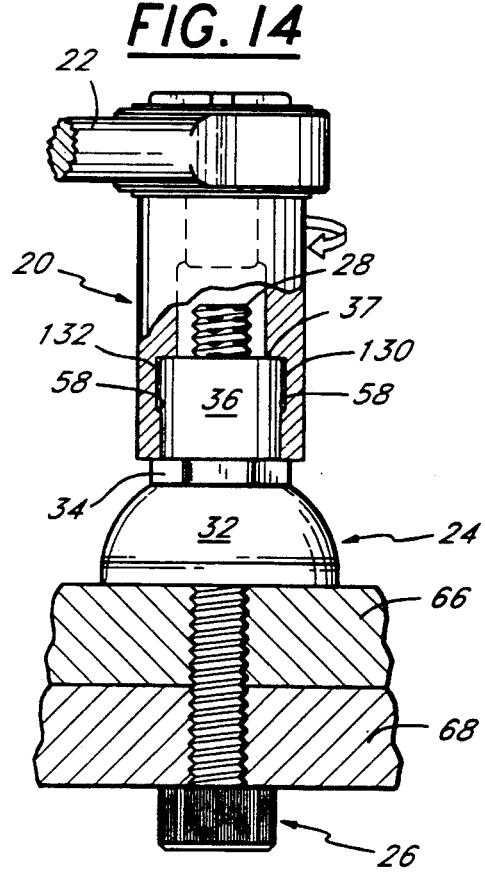
FIG. 14 is the partial cross-sectional view of FIG. 2 with the installation tool and driver rotated to fill the pockets on the tool with deformed collar mass.

Installation of a fastener utilizing the present installation tool 20 will now be described with reference to FIGS. 2, 13 and 14 and the preferred embodiment of the invention.

As illustrated in FIG. 2, the bolt 26 is inserted through work pieces 66 and 68 which are being fastened together and the collar 24 is placed on the threaded portion 28 of the bolt 26. The installation tool 20 is attached on the socket driver 22 and the tool 20 is positioned to engage the collar 24 to thread it on the bolt 26. The wrenching portions 54 abut and contact the deformable head portion 36 of the collar 24. Thus, as the tool 20 is rotated, force is applied to the deformable head portion 36 by the wrenching portions 54 that contact the collar 24. Initially, the resistance to rotation is minimal and the tool 20 and collar 24 rotate at the same rate.

As the collar 24 is tightened onto the bolt 26 the resistance to threading increases. When sufficient resistance to threading occurs the installation tool 20 will begin to deform the collar 24 as shown in FIG. 13. The installation tool 20 advantageously deforms the collar 24 first at the end of the head portion 36 closest to the base 32, and moving up towards the free end 37 of the collar 24 as the tool 20 is rotated. The collar 24 is first deformed upward into the pockets 60, 62 on the cavity 42 of the tool 20 until the pockets 60, 62 are filled or partially filled with collar mass 130, 132 respectively, as illustrated in FIG. 14. As the tool 20 continues to be rotated about the stationary collar 24, less volume of the pockets 60, 62 is available for the collar masses 130, 132, as the wrenching portions 54 are rotated past the deformable portion 36 of the collar 24. This forces the collar masses 130, 132 radially into the bolt 26.

Advantageously, the initial deformation of the collar 24 does not result in the collar 24 and bolt 26 being locked together by forcing collar mass 130, 132 into recesses 27 on the bolt 26. Thus, the appropriate preloaded tension on the bolt 26 is generated before the collar 26 and bolt 26 are locked together. This ensures that the proper amount of torque, as indicated by deformation of the collar 24, is generated by permitting further rotation of the collar 24 after deformation has begun. In particular, the collar mass 130, 132 is first deformed upward into the pockets 60, 62 before it is forced radially inward toward the bolt 26. After the wrenching portion 54 of the tool 20 has been rotated across the collar 24, the collar 24 will be deformed radially inwardly from its out-of-round shape to a circular shape which prevents the application of further torque. Once the deformable head portion 36 is completely deformed inward to the bolt 26 and no collar mass 130, 132 remains in the pockets 60, 62, the tool 20 may be removed from the collar 24.

Deforming the collar 24 and forcing deformed collar masses 130, 132 into the pockets 60, 62 of the installation tool 20 in this manner also reduces the cam off tendency experienced with prior art tools. Since the collar masses 130, 132 are deformed into the pockets 60, 62, the shoulder 58 of each wrenching portion 54 abuts against the collar masses 130, 132. Therefore, the collar masses 130, 132 counter the cam off forces and hold the collar 24 in engagement with the tool 20. As the tool 20 moves around the collar 24 more collar mass 130, 132 is deformed until the pockets 60, 62 are entirely filled with collar mass 130, 132 as in FIG. 14. After the pockets 60, 62 are filled, the collar masses 130, 132 are then deformed inward toward the bolt 26 as the tool 20 rotates further. The collar masses 130, 132 continue to be deformed inward because the size of the pockets 60, 62 available to be filled by deformed material 60, 62 effectively is reduced as the tool 20 rotates and the size of the pockets 60, 62 decreases. Thus, the deformed collar masses 130, 132 hold the tool 20 on the collar 24 until the collar masses 130, 132 are completely deformed inward and the head portion 36 is deformed to a circular cross-sectional shape. The tool 20 does not counter the cam off tendencies after complete deformation of the collar 24 and the tool 20 can then be removed without resistance.

Figure 7:
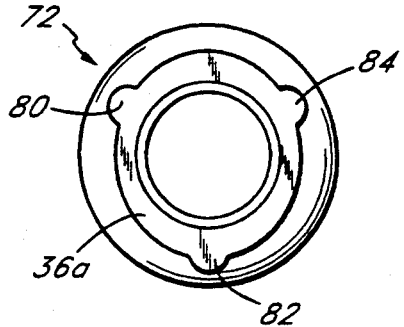
FIG. 7 is a top plan view of a prior art collar of another locking fastener system.

It should be understood that the present invention may be adapted for use on other locking fasteners in which the collar is deformed. In an second embodiment, shown in FIGS. 7-10, an installation tool 70 is adapted for use with the fastener disclosed in U.S. Pat. No. 4,383,353 issued to Stencel, which is herein incorporated by reference. As illustrated in FIG. 7, a collar 72 of Stencel has three deformable lobes 80, 82 and 84 that extend longitudinally along the exterior of an end portion 36a. Where possible, like numbers with an "a" suffix have been used to indicate like parts of the first and second embodiments for ease of understanding. The lobes 80, 82 and 84 are spaced equally apart along the circumference of the end portion 36a. When a predetermined torque is applied, the lobes 80, 82 and 84 are designed to be deformed inward toward the axis of the collar 72 thereby displacing other collar material inward to lock the collar 72 on a bolt.

Figure 8:
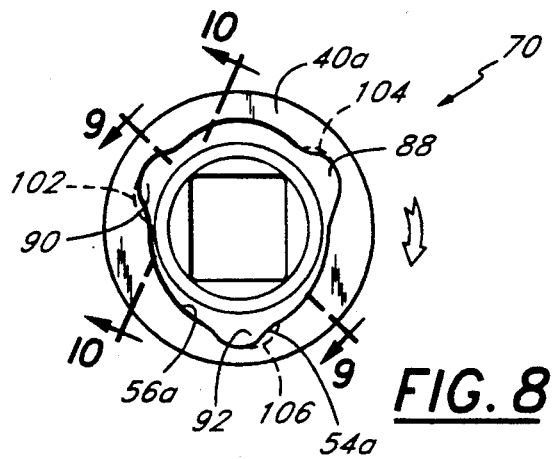
FIG. 8 is a bottom plan view of a second embodiment of the installation tool of the present invention.
Figure 9:
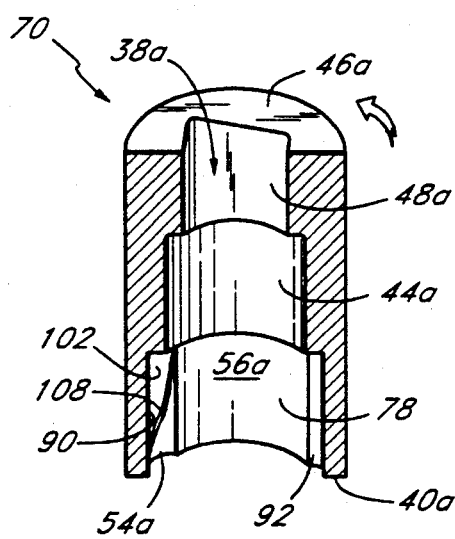
FIG. 9 is a cross-sectional view of the installation tool of FIG. 8, taken along line 9—9.
Figure 10:
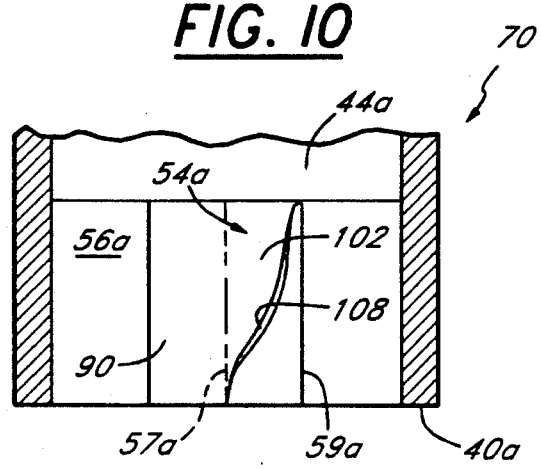
FIG. 10 is a partial cross-sectional elevation of the tool of FIG. 8, taken along line 10—10.

The installation tool 70 adapted for use on the collar 72 of Stencel is illustrated in FIGS. 8-10. The installation tool 70 is similar in structure and composition to the installation tool 20 of the preferred embodiment except that a cavity 78 of the second embodiment of the installation tool 70 has a shape complementary to the end portion 36a of the collar 72 of Stencel. Additionally, it should be noted that the second embodiment of the installation tool 70 is adapted here for a left-hand threaded collar, while the preferred embodiment of the installation tool 20 was described for a right-handed thread.

As is most clearly shown in FIG. 9, the second embodiment of the installation tool 70 has a generally cylindrical shape with a stepped axial bore 38a therethrough. The bore 38a begins at a top end 46a of the tool 70 and proceeds downward first defining a recess 48a for attaching the tool 70 to the socket driver 22 and then defining a central portion 44a which is sized to accommodate the threaded portion of the bolt 26 when the collar 72 is being attached. The cavity 78 in the second embodiment extends from the central portion 44a to a bottom end 40a. Preferably, the cavity 78 is generally cylindrical in shape. Along an interior wall 56a of the cavity 78 there are three longitudinal slots 88, 90 and 92 spaced equally apart along the circumference of the wall 56a to accommodate the lobes 80, 82 and 84.

A wrenching portion 54a is located in each slot 88, 90 and 92 to contact the lobes 80, 82 and 84 and apply the force necessary to thread the collar 72 on the bolt 26. Each wrenching portion 54a covers approximately half the area of the slots 88, 90 and 92. The wrenching portions 54a extend vertically from the bottom end 40a to the central portion 44a. The wrenching portions 54a also extend along the wall of the slots 88, 90 and 92 from a leading edge 57a to a trailing edge 59a. The leading edge 57a is the edge of the slot 88, 90 or 92 that contacts the lobes 80, 82 and 84 and first advances during rotation of the tool 70 in the direction of threading. The trailing edge 59a is the edge of the slots 88, 90 and 92 last to contact the lobes 80, 82 and 84 in rotation of the tool 70.

The second embodiment of the tool 70 further comprises three pockets 102, 104 and 106 extending radially outward from the longitudinal axis of the tool 70 into the wall 56a of the cavity 78. Near the central portion 44a of the tool 70, the pockets 102, 104 and 106 cover the full width of the wrenching portion 54a from the leading edge 57a to the trailing edge 59a as shown in FIG. 10. The height the pockets 102, 104 and 106 extend from the central portion 44a toward the bottom end 40a varies, but gradually decreases from the leading edge 57a to the trailing edge 59a to reduce space in the pockets 102, 104 and 106 and the area of the wrenching portion 54a covered. As illustrated in FIG. 10, the pocket 102 begins with a height slightly less than that of the cavity 78 of the tool 70. Moving from left to right, the height of the pocket 102 gradually decreases to zero near the trailing edge 59a. Since the pockets 102, 104 and 106 do not extend over the entire wrenching portion 54a, the cavity 78 retains the dimensions suitable for a close fit on the end portion 36a of the collar 72 as illustrated in FIG. 8.

The depth of the pockets 102, 104 and 106 also varies, but advantageously tapers the pockets 102, 104 and 106 to shape of the slots 88, 90 and 92. Near the edges 57a, 59a of the wrenching portions 54a, the depth of the pockets 102, 104 and 106 diminishes to zero, but in the middle of the wrenching portion 54a, the pockets 102, 104 and 106 have a thickness sufficient to retain the tool 70 on the collar 72 when the pockets 102, 104 and 106 are filled with deformed collar mass.

As in the preferred embodiment, each pocket 102, 104 and 106 forms a shoulder 108. As the end portion 36a of the collar 72 is deformed, the deformed portion of the lobes 80, 82 and 84 is forced into the pockets 102, 104 and 106. The deformed portions of the lobes 80, 82 and 84 act on the shoulder 108 and resist the cam off forces that drive the tool 70 off the collar 72. The lobes 80, 82 and 84 are further deformed as the tool 70 moves across the collar 72 until no deformed portion remains in the pockets 102, 104 and 106 and the tool 70 can be disengaged from the collar 72.

Figure 11:
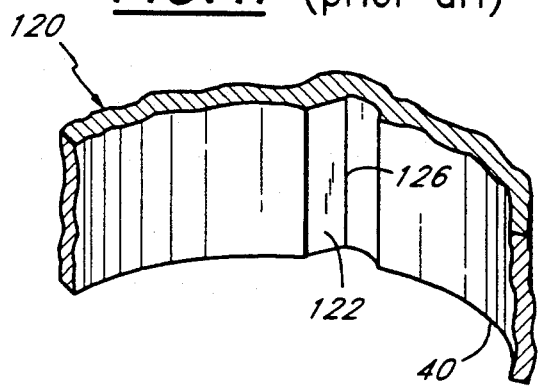
FIG. 11 is a partial perspective view of a prior art tool.
Figure 12:
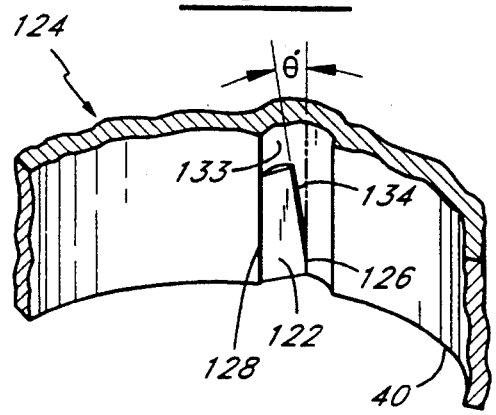
FIG. 12 is a third embodiment of the installation tool of the present invention.

A portion of a prior art installation tool 120 presently used on the collar 72 of Stencel is illustrated in FIG. 11. The tool 120 includes a straight section 122 that contacts the lobes 80, 82 and 84 on the collar 72. This straight section 122 extends beyond the end portion 36a of the collar 72 when a collar 72 is inserted into the tool 120. It should be noted that the straight section 122 provides no relief or pocket in which deformed collar material may be retained. This tool 120 is design to counter cam off, however, it experiences the cam off condition like other installation tools in the art. Nonetheless, the straight section 122 of the prior art installation tool 120 may be adapted in accordance with present invention to produce an installation tool 124 that reduces cam off. The installation tool 124 constructed according to a third embodiment of the present invention is illustrated in FIG. 12. As can be seen from FIG. 12, the forward edge 126 of the straight section 122 is angled inward toward a rear edge 128 of the straight section 122 to form a pocket 133 defined by a shoulder 134 in accordance with the present invention. The angle measured from the forward edge 126 to the vertical axis is preferably between zero and 90 degrees. Therefore, the shoulder 134 advantageously retains deformed collar mass which is forced into the pocket 133 so as to resist the cam off tendencies of the tool 124. The pocket 133 is advantageously limited to part of the wrenching portion, thus, the shoulder 134 counter acts the cam off tendencies only during the tightening and deformation of the collar 72.

Having described the invention in connection with certain preferred embodiments thereof, it will be understood that many modifications and variations thereto are possible, all of which fall within the true spirit and scope of this invention.

What is claimed is:

1. An installation tool for fastening a locking collar and a bolt, the installation tool defining a cavity sized to engage a deformable portion of the collar, said installation tool further comprising:

first and second wrenching portions spaced equally apart along an interior wall of said cavity, said first and second wrenching portions directly contacting and driving the deformable portion of the collar;

a first pocket on said first wrenching portion, said first pocket tapered in depth to the interior wall of said cavity, said first pocket decreasing in axial height from a leading edge to a trailing edge of said first wrenching portion, said first pocket sized to accommodate collar material to reduce the cam off tendency of the tool;

a first shoulder defined between said first wrenching portion and said first pocket, said first shoulder abutting against collar mass deformed into said first pocket during the threading of the collar onto the bolt to reduce the cam off of the tool from the collar;

a second pocket on said second wrenching portion, said second pocket tapered in depth to the interior wall of said cavity, said second pocket decreasing in axial height from a leading edge to a trailing edge of said second wrenching portion, said second pocket sized to accommodate collar material to reduce the cam off tendency of the tool;

a second shoulder defined between said second wrenching portion and said second pocket, said second shoulder abutting against collar mass deformed into said second pocket during the threading of the collar onto the bolt to reduce the cam off of the tool from the collar.

2. The tool of claim 1 wherein said first and second pockets have a generally triangular shape with a side adjacent a central portion of said tool, a second side adjacent the leading edge of said wrenching portion and a third side along said first and second shoulders.

3. The tool of claim 2 further defining a recess at the opposite end of the tool from said cavity, said recess adapted for engaging a driver.

* * * * *